Aug. 31, 1948.    M. JENKINS    2,448,220
CHANGE-OVER SYSTEMS FOR CINEMATOGRAPHIC PROJECTORS
Filed July 25, 1944    2 Sheets-Sheet 1
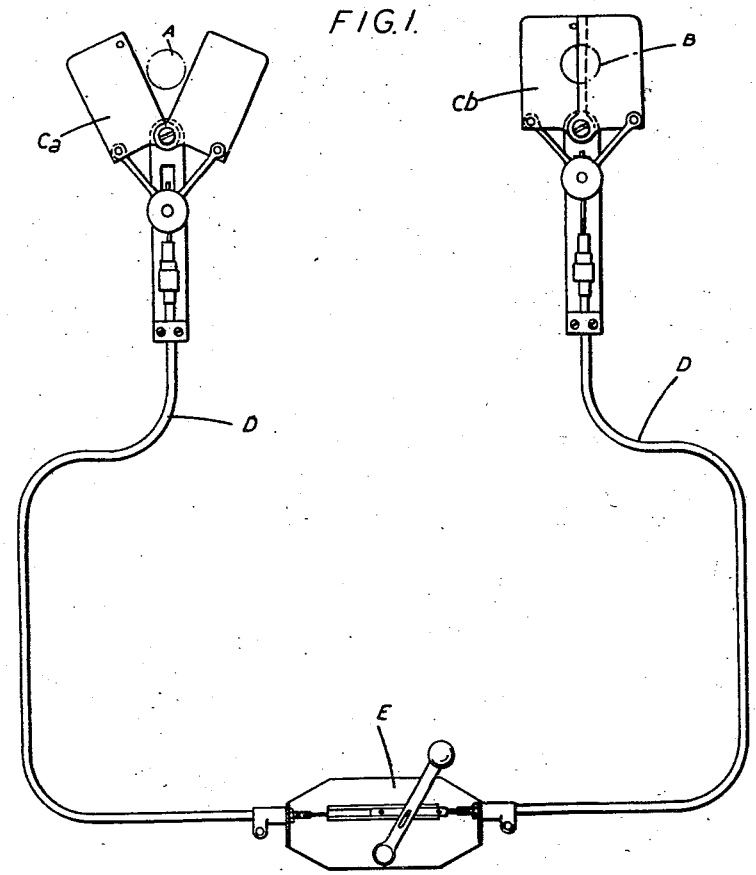
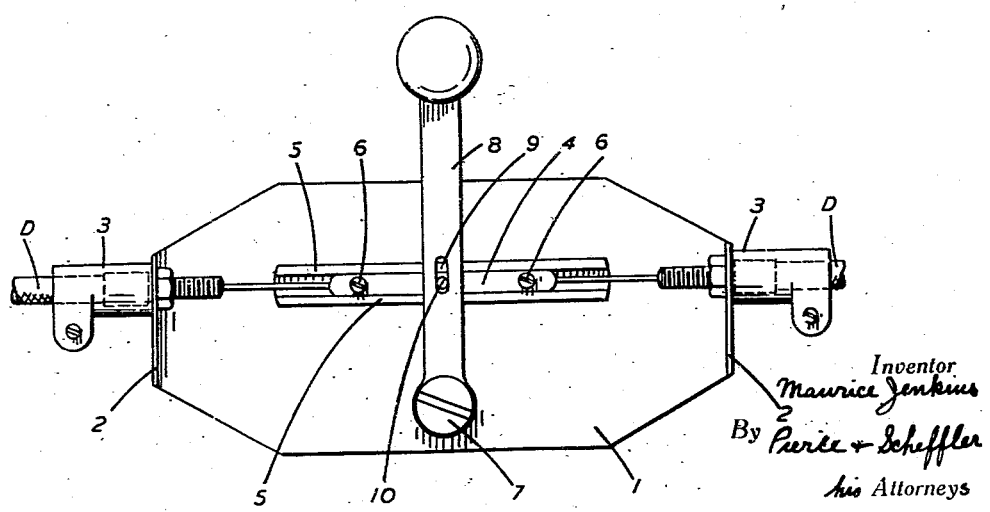

Aug. 31, 1948.  M. JENKINS  2,448,220
CHANGE-OVER SYSTEMS FOR CINEMATOGRAPHIC PROJECTORS
Filed July 25, 1944  2 Sheets-Sheet 2
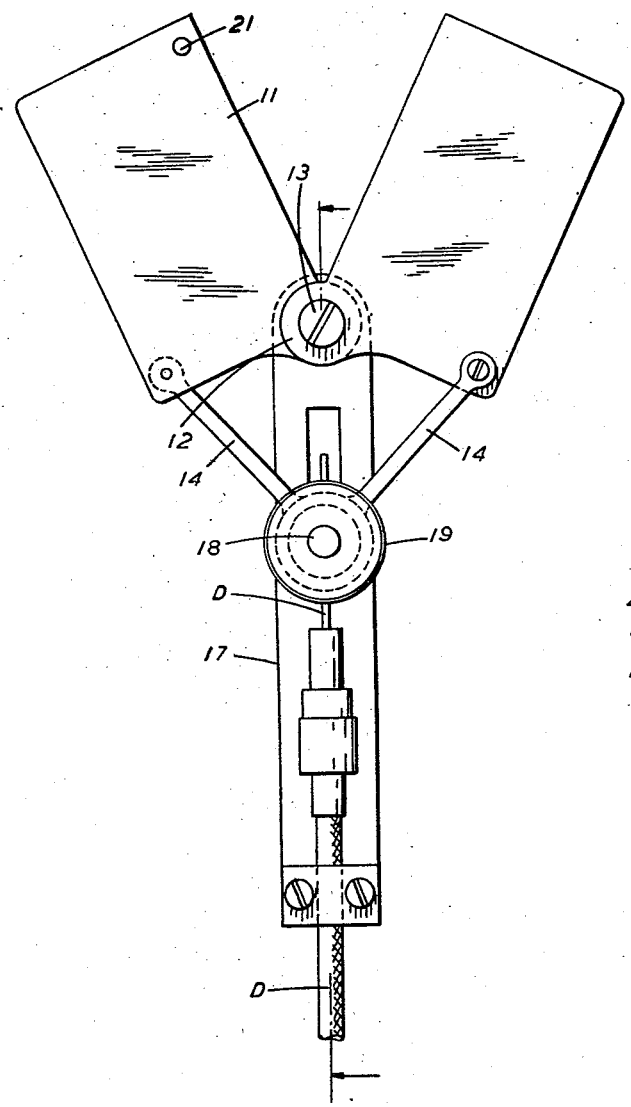
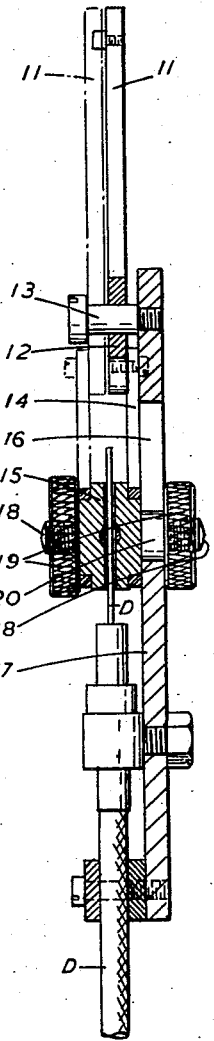
Inventor
Maurice Jenkins
By Pierce + Scheffler
his Attorneys Patented Aug. 31, 1948

2,448,220

UNITED STATES PATENT OFFICE 2,448,220

CHANGE-OVER SYSTEM FOR CINEMATOGRAPHIC PROJECTORS

Maurice Jenkins, London, England

Application July 25, 1944, Serial No. 546,499
In Great Britain July 1, 1943

Section 1, Public Law 690, August 8, 1946
Patent expires July 1, 1963

1 Claim. (Cl. 88—16)

The present invention relates to cinematograph projecting systems, and has for its object to provide means for enabling projection to be changed over from one machine to another without interrupting the continuity of projection. For example, it may be desired to change over without an interval from a machine whose reel is nearly exhausted to another machine which has been prepared ready for projecting the next reel.

Each machine is provided with a shutter device mounted to operate in front of the projection tube, and according to the invention the two shutters are interconnected by a Bowden wire or other flexible transmission means associated with a lever mechanism whereby the transmission means may be operated to close the shutter of either machine and open the shutter of the other machine simultaneously.

Preferably the arrangement is such that the open shutter holds the other shutter in the closed position by gravity action. For example, the shutters may be pivoted for angular movement about points along or adjacent to their lower edges.

In order that the invention may be clearly understood and readily carried into practice, it is illustrated, by way of example only, in the accompanying drawings, in which:

Figure 1 is a diagram of the complete shutter control system according to the invention;

Figure 2 is a front view of one of the shutter devices;

Figure 3 is a sectional side elevation thereof, and

Figure 4 shows the operating lever device in plan or front view, according as the device is fixed in a horizontal or vertical position.

Referring to the drawings the dotted circles A, B indicate the projection tubes of a pair of cinema projectors which are to be used alternately in projecting films. Each of them is provided, in front of its projection tube with a shutter $Ca$, $Cb$ of identical construction in the two cases. The two shutters $Ca$, $Cb$ are connected by Bowden wires D, D with a common operating lever mechanism E, which may be operated either to open shutter $Ca$ and simultaneously close shutter $Cb$ or to close shutter $Ca$ and simultaneously open shutter $Cb$.

Referring now to Figure 4 the operating lever device comprises a base plate 1 having a bracket 2 at each end carrying guide nipples 3 through which pass the Bowden wires D, D, the sheathes of which abut against said brackets 2, 2 or are gripped by said nipples 3. Said brackets 2, 2, may, for example, be formed by flanges or lips bent over at the ends of the base plate 1.

The ends of the two wires D, D are disposed in alignment, and attached to a bar 4 sliding between channel guides 5 on the base plate 1. Alternatively to providing guides 5 the bar 4 may be engaged longitudinally with a slot in base plate 1. The ends of the bar 4 are bored to receive the wires D, D, which are held in the bores by clamping screws 6. Below the sliding bar 4 is pivoted at 7 to the base plate 1, the lower end of the operating lever 8, which has a knob at its free end, and medially has a slot 9 engaged with a pin 10 projecting centrally from the sliding bar 4. By angular movement of the lever 8 the sliding bar 4 can be moved longitudinally to pull on one Bowden wire D and slacken the other, so that the shutters $Ca$, $Cb$ attached to the two ends of the wires D, D are respectively closed and opened.

The shutter devices $Ca$, $Cb$, illustrated in detail in Figures 2 and 3, consist of a pair of substantially rectangular shutter plates 11, which, when in closed position, have a pair of longitudinal edges overlapping vertically. The overlapping lower corners of the plates carry offset lugs 12, 12 through which passes a bolt 13 about which the plates 11, 11 pivot. To the outer lower corners of the shutter plates 11, 11 are pivoted links 14, the other ends of which are engaged with a common pivot member 15, which is also engaged with a slot 16 in a plate or bracket 17 supporting the main shutter pivot 13. To the said pivot member 15 is attached the Bowden wire D, which operates the shutters 11, 11 by moving the pivot member 15 along the slot 16, either towards or away from the shutter pivot 13, so that the links 14, acting on the lower corners of the shutter plates 11, 11, move said plates angularly towards or away from one another.

In the preferred construction shown the pivot member 15 consists of a block having a pair of cylindrical projections or bosses, one on each side, for engagement in ring shaped end portions on the said links 14, and threaded projections 18 project centrally from said bosses to receive milled nut members 19 which retain the links 14 on said cylindrical projections or bosses. One of said threaded projections 18 is however longer than the other and has a smooth portion 20 to pass through the slot 16 in the aforesaid plate or supporting bracket 17, so that said bracket 17 lies between the end portion of the adjacent link 14 and the retaining nut 19.

A stop pin 21 is provided on one of the shutter plates 11 to arrest the two shutters with the desired extent of overlap when in the closed position.

As will be appreciated, due to the pivoting of the shutter plates 11, 11 by means of the lugs 12 off-set at their corners, the shutters will always tend to open by gravity and resistance will be offered to closing movement. Consequently the open shutter will always set by gravity to hold the closed shutter in closed position, until the functions of the two shutters Ca, Cb are reversed by the operating lever device E.

The mechanism of the lever device E is preferably enclosed in a casing or cover having a slot through which the lever 7 projects, said cover being attached to the base plate 1.

It will be appreciated that when a shutter operating mechanism according to the invention is installed, it is necessary to so adjust the Bowden wire mechanism, that when one shutter device A or B is closed, the other is open. Either projector can then be changed over for the other simply by operating the lever 7 in one direction or the other, to close the shutter device of the operating projector and simultaneously open the shutter device of the projector which is to take its place.

It will be understood that the invention is not limited to the use of Bodwen wire mechanism, or even to a steel wire and sheathe transmission mechanism, since any other form of push pull mechanical transmission mechanism may be used, as, for example, articulated rods.

I claim:

In combination with a pair of projecting machines, a pair of shutter devices, operating mechanism and a universally flexible transmission means connecting each shutter device to said operating mechanism; said operating mechanism comprising a sliding bar connected to each of said flexible transmission means and means for shifting said sliding bar; each shutter device comprising a pair of plates mounted for angular movement about a common pivot and extending laterally and vertically from said common pivot whereby gravity tends to move said plates to open position, a sliding block mounted for movement in a line passing through said common pivot and connected to one of said flexible transmission means and a pair of links each connecting a pivot on said sliding block with an indepedent pivot on one of said plates; the pivots on said sliding block having a common axis in the line of movement of said block and the independent pivots on said plates being laterally spaced apart from the common pivot thereof, whereby said operating mechanism may be positioned independently of said shutter devices within the range of said flexible transmission means and whereby movement of said sliding bar simultaneously opens one of said shutter devices and closes the other through movement of said flexible transmission means, said sliding blocks and said links.

MAURICE JENKINS.

REFERENCES CITED

The following references are of record in the file of this patent:

UNITED STATES PATENTS

| Number | Name | Date |
| --- | --- | --- |
| 941,752 | Ashley | Nov. 30, 1909 |
| 1,718,782 | Griem | June 25, 1929 |
| 1,734,221 | Markham | Nov. 5, 1929 |
| 1,738,943 | Brinkert et al. | Dec. 10, 1929 |
| 1,958,353 | Stableford | May 8, 1934 |
| 2,083,574 | Brown | Aug. 3, 1937 |
| 2,109,499 | Matteson | Mar. 1, 1938 |
| 2,128,986 | Chilton | Sept. 6, 1938 |
| 2,368,804 | Chatelain | Feb. 6, 1945 |